United States Patent [19]
Young et al.

[11] 3,851,759
[45] Dec. 3, 1974

[54] NAIL STRIP AND METHOD OF MAKING SAME

[75] Inventors: Hobart P. Young, Winnetka; Donald W. Noren, Morton Grove, both of Ill.

[73] Assignee: Signode Corporation, Glenview, Ill.

[22] Filed: Oct. 16, 1973

[21] Appl. No.: 406,795

Related U.S. Application Data

[63] Continuation of Ser. No. 217,868, Jan. 14, 1972, abandoned.

[52] U.S. Cl. ................................. 206/338, 29/509
[51] Int. Cl. ..................... B65d 79/00, B23p 11/00
[58] Field of Search................... 206/338, 343, 345; 29/509, 160

[56] References Cited
UNITED STATES PATENTS

| | | | |
|---|---|---|---|
| 462,500 | 11/1891 | Miles | 29/160 UX |
| 3,083,369 | 4/1963 | Peterson | 206/338 |
| 3,133,644 | 5/1964 | D'Olive et al. | 29/509 X |
| 3,225,917 | 12/1965 | Couch | 206/345 |
| 3,442,374 | 5/1969 | Hillier | 206/344 |
| 3,481,459 | 12/1969 | Becht | 206/343 |
| 3,553,831 | 1/1971 | Palmer et al. | 29/509 X |

*Primary Examiner*—Leonard Summer
*Attorney, Agent, or Firm*—Dressler, Goldsmith, Clement & Gordon, Ltd.

[57] ABSTRACT

A nail strip assembled by a cold working process. A series of nails is provided with notches in the shank of each. A serrated wire is disposed in the notches and the shank material is then swaged to clinchingly secure the filaments to the shanks. The wire provides a multiplicity of serrations so that when a nail is to be driven, the wires will break preferentially at a serration. The serrations open toward the top and bottom of the nail strip, rather than to the front and back of the nail strip.

15 Claims, 14 Drawing Figures

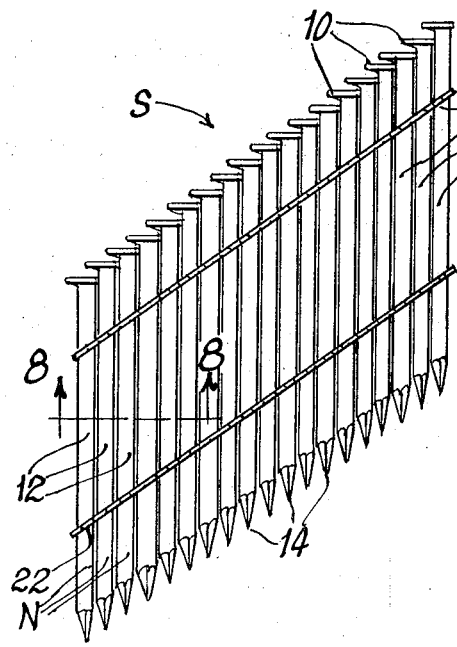
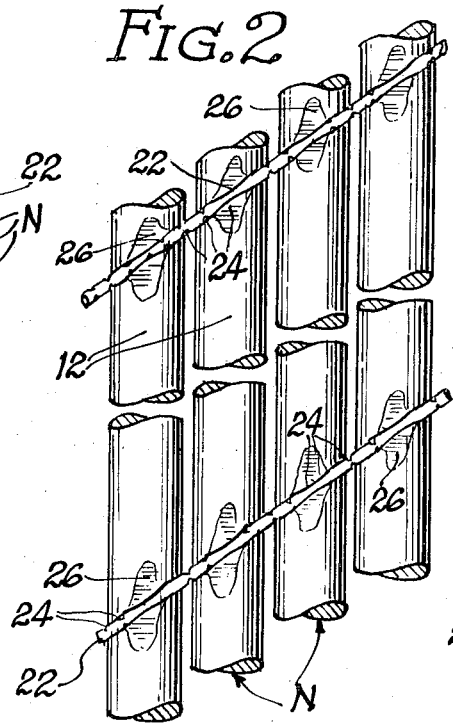
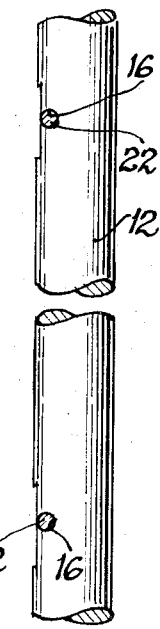
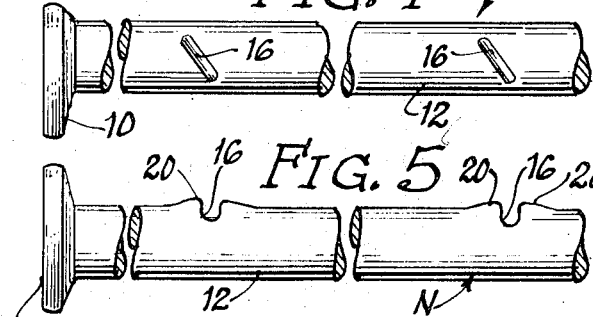
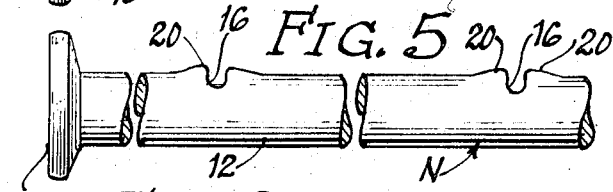
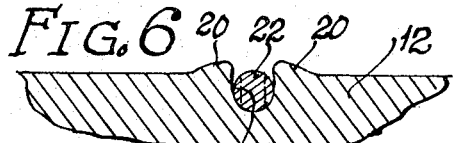
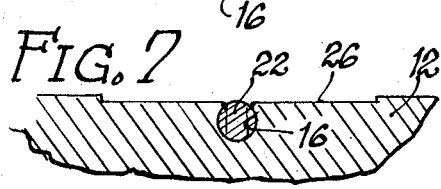
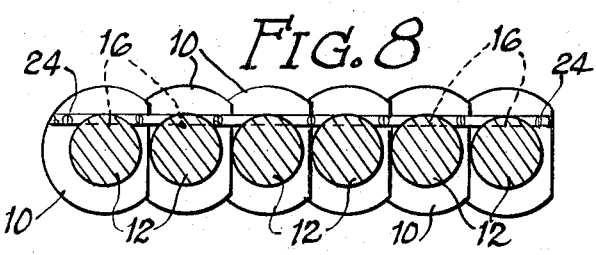
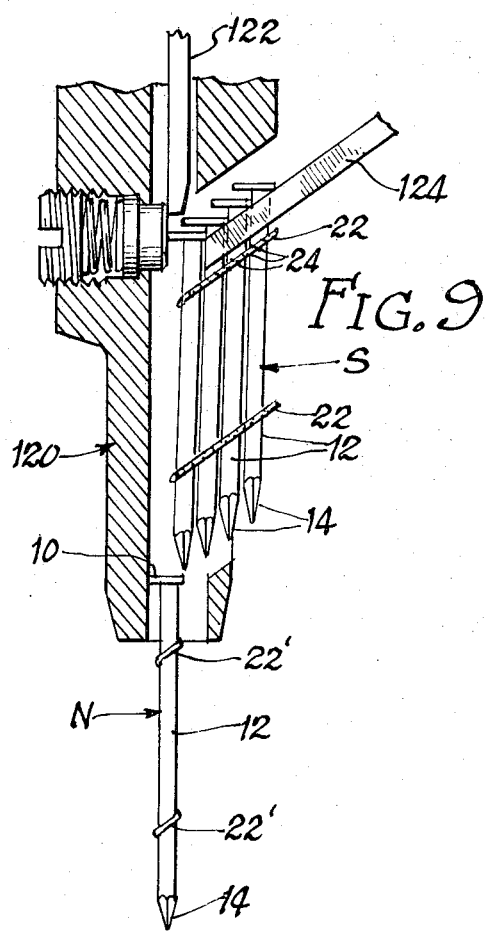

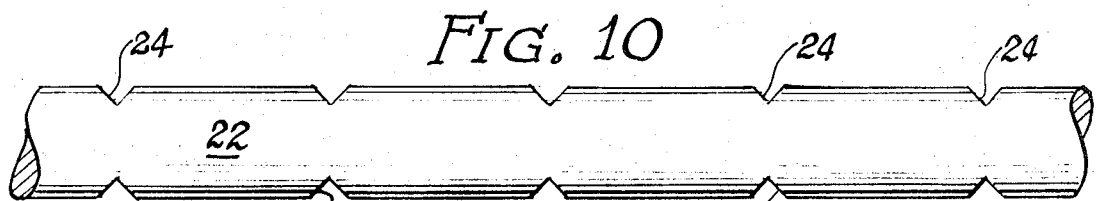
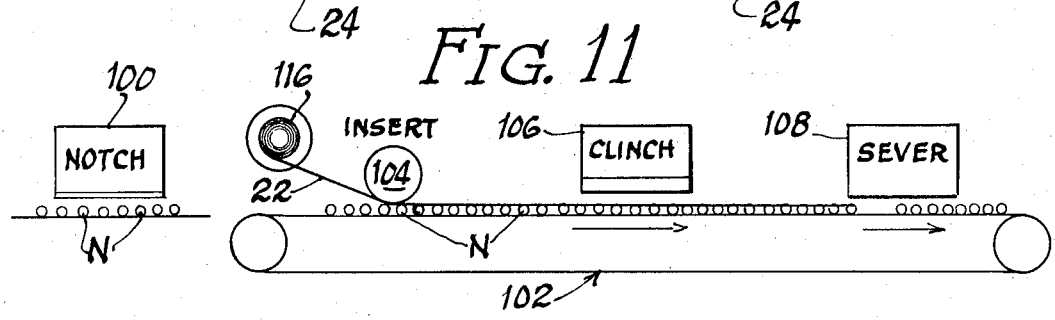
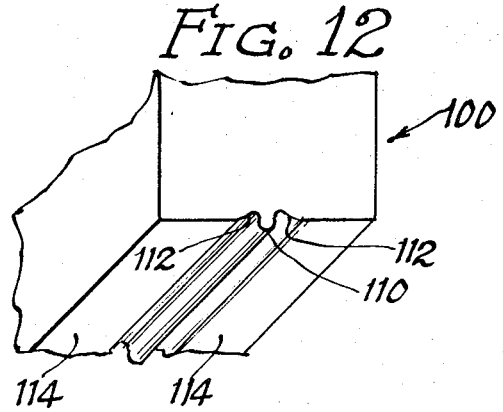
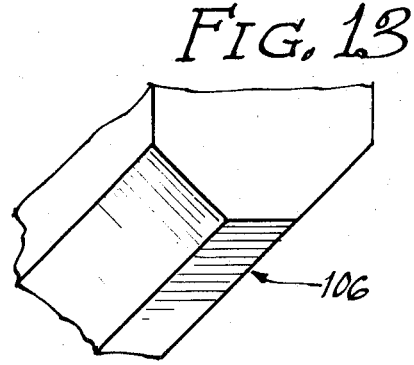
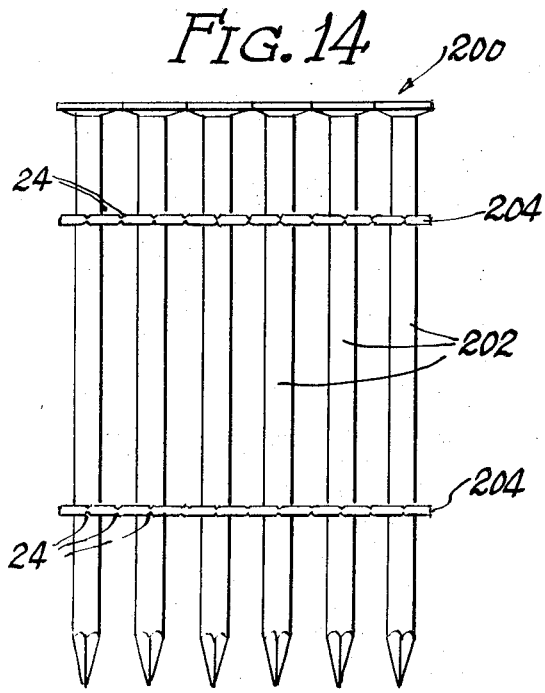

NAIL STRIP AND METHOD OF MAKING SAME

This is a continuation of application Ser. No. 217,868, filed Jan. 14, 1972, now abandoned.

This invention relates to an improved method of assembling a nail strip and to an improved nail strip which is especially adapted for use in a nailing machine.

A wide variety of methods for releasably coupling a plurality of nails into nailing strips have been suggested and used in the past. Some of these methods have involved the application of adhesive and tape to nails to couple them together. Other assembly methods have utilized carrier strips to which nails have been secured, as by their heads, while still others have coupled nails by welding or brazing carrier wires to the nails. A further method of assembling nail strips which has been suggested involves the insertion of resilient filaments, such as of plastic, in notches formed in the heads of nails, and their retention in the notches by frictional forces.

Exemplary of various approaches to the fabrication and assembly of nail strips are those strips illustrated in patents, such as Working U.S. Pat. No. 2,784,405, Hillier U.S. Pat. No. 3,442,374, Becht U.S. Pat. No. 3,478,872 and Peterson U.S. Pat. No. 3,083,369. Some of those patents involve the use of extraneous material, which in some cases will collect and lodge in a nailing machine, sometimes causing it to malfunction, and frequently requiring it, and the area in which it is used, to be cleaned. Other of the patents describe nail strips which require the use of brazing or welding procedures to assemble them, procedures which are expensive and which require elaborate assembly equipment.

A nailing strip of this invention may be easily and quickly assembled by a cold process, and without elaborate collating and assembly equipment. When used, the strips leave no residue or clutter in the nailing machine or in the area in which they are used.

In accordance with a preferred method of this invention, a multiplicity of substantially identical nails which are to be secured in a side-by-side array into a nail strip are arranged with their points facing in the same direction and with their shanks generally parallel to each other and in a position of close adjacency. Transverse notches are provided in the shank of each nail, preferably at two longitudinally spaced locations, the notches in adjacent nails being in alignment, whereby at least two rows of aligned notches in the nail array are provided. The notches are preferably formed in the shanks, as by pressing against the shank at the longitudinally spaced locations with appropriately shaped notching tools or the like which displace shank material, part of which is squeezed upwardly and sidewardly of the formed notches to form bulges or projections at the notch sides.

Thereafter, an elongate filament or wire is positioned in each of the rows of aligned notches. To provide the desired degree of preferential frangibility, the wires are desirably provided with a large multiplicity of zones of diminished cross-section. After the wires are inserted and positioned in the notches, the shanks are swaged radially inwardly at the notch sides so that shank material is displaced, mechanically to clinch the wires in the notches and to resist removal of the wires from the notches. The nail strip is then severed into desired lengths. At that time, the nail strip has been completed and, as will have been noted, without the application of extraneous material to the nails other than the wires themselves.

When a nail strip made in accordance with the cold working method of this invention is to be used, it is inserted in an appropriate nailing machine. When a nail is to be driven, a driver blade acts upon a nail head to drive it into material to be nailed. As the nail is driven downward, the wires are stressed and because they are clinched and held in the notches by the shank material, portions of the wires are broken away from the main body of the wires and are carried with the nail to be embedded in the material being nailed, thereby improving the holding power of the nail. As has been stated, to facilitate separation of portions of the wires as the nails are driven, the wires are desirably provided with the indicated large multiplicity of zones of diminished cross-section, at which zones they preferably break away during a driving operation. Because the wires are provided with a large multiplicity of frangible zones of diminished cross-section, such as at least three times as many such zones as there are nails in the nail strip, it is not necessary precisely to locate the zones of diminished cross-section, as by positioning one between each pair of adjacent nail shanks.

Nail strips manufactured in accordance with this invention are suitably flexible so that, when desired, they may be formed into bundles or rolls, although they may be severed into lengths for use in straight magazines as well. In any event, the strips are sufficiently flexible so that they are not easily broken, as frequently occurs with brittle, glued strips of nails. Because the connecting wires are severed and are carried out of a nailing machine into the material to be nailed as a nail is driven from the strip, there is no paper, glue or other residue to clog the nailing machine or to clutter the area in which the tool is being used. Furthermore, because the entire nail strip may be made of a single material, such as of steel, it is not subject to damage or to degradation, as by moisture, by heat and by other forms of weathering, which sometimes tend adversely to affect paper, glues, plastic and the like, either during assembly, or after the nail strips have been manufactured. The method of assembly of this invention allows for very precise alignment of nails in the nail strip and for very close control over the spacing between adjacent nails. Finally, the manufacture of nail strips of this invention is considerably less expensive than conventionally used methods and other methods which have been suggested for use.

Further objects, features and advantages of this invention will become apparent from the following description and drawings, of which:

FIG. 1 is a nail strip assembled in accordance with this invention;

FIG. 2 is an enlarged fragmentary view of a portion of FIG. 1;

FIG. 3 is a side elevational view of one of the nails of FIG. 2;

FIG. 4 is an enlarged view of one of the nails of FIG. 1 prior to assembly with a wire;

FIG. 5 is a side elevational view of FIG. 4;

FIG. 6 is an enlarged fragmentary cross-sectional view of FIG. 5, with a wire positioned in a notch;

FIG. 7 is a view similar to FIG. 6 with a wire clinchingly engaged by the nail shank;

FIG. 8 is a cross-sectional view taken substantially along the line 8-8 of FIG. 1;

FIG. 9 illustrates a nailing machine adapted to drive nails from a nail strip of FIG. 1.

FIG. 10 is an enlarged section of a wire of FIG. 1;

FIG. 11 is a schematic representation of an apparatus adapted to carry out a cold working method of this invention;

FIG. 12 is an enlarged perspective view of a notching tool of FIG. 11;

FIG. 13 is an enlarged perspective view of a swaging tool of FIG. 11; and

FIG. 14 is an enlarged view of a further nail strip assembled in accordance with this invention.

Referring now to the drawings, a preferred embodiment of a nail strip assembled in accordance with a cold working process of this invention is designated by the reference character S. Nail strip S comprises a large multiplicity of nails N, each of which is substantially identical, and each of which has a D head 10, an elongate shank 12 and a point 14. In the embodiment of FIGS. 1 to 9, the nail heads 10 are segmental or chordal, i.e., are only approximately half round. By so configuring the heads, and by positioning the heads to overlap as generally illustrated in FIG. 1, the shanks 12, when parallel to each other, may be positioned in very close adjacency, thereby to make a nail strip S which is quite compact.

Each nail N is provided with a pair of notches 16 spaced apart lengthwise of shank 12. Notches 16 are disposed angularly with respect to an intersecting plane including the shank axis. In the nail strip S of FIG. 1, that angular disposition is generally diagonal. Because notches 16 are preferably formed as by a pressing or squeezing operation, which displaces rather than removes shank material (as would a cutting operation), at least some of the displaced shank material forms bulges or projections 20 adjacent the notches. That is best seen in FIGS. 4 and 5, and is controlled during the squeezing operation by an appropriately configured notching tool 100. Desirably, the notches 16 extend inwardly of the surface of the shank a radial distance no greater than about forty percent of the diameter of the shank, and preferably no more than about twenty percent. As such, only a small fraction of the nail shank cross-section is notched and the strength of the nail shank is not significantly lessened. Furthermore, to enhance the stability of the nail strip, the notches 16 are each preferably remote from the head and point and are spaced apart a distance equal to at least about fifty percent of the length of the shank.

To assemble a multiplicity of notched nails into a nail strip S, they are positioned with their respective notches 16 in alignment, as on a conveyor 102, thereby to form a pair of rows of aligned notches. When they are so aligned, the notches are ready to receive suitable elongate filaments or wires 22. Wires 22 may be round, although other cross-sectional configurations may be used as well. Wires 22 may be identical and are preferably of a fine steel, as of a hard drawn wire 0.02 inch in diameter, which has been provided with a large multiplicity of serrations or zones of diminished cross-section 24 to facilitate severance of portions of the wires from the main bodies of the wires when a nail is severed from the nail strip S by a nailing machine. The zones of reduced cross-section may be formed by passing the wires 22 through die means, such as opposed knurled wheels which press notches into the sides of the wire. The use of opposed knurled wheels makes it possible to control the depth of serrations 24 and their locations quite closely. Preferably the serrations are generally V-shaped with the bases of the serrations lying in a common plane which is normal to the wire axis. The combined radial penetration of confronting serrations 24 is preferably less than about fifty percent of the diameter of wire 22.

It has been determined that serrations 24 perform most effectively if they are opposed, i.e., they are diametrically spaced, and if they are oriented to open toward the heads and points of the nails, i.e., at the top and bottom of the wires, rather than at the front and back of the wires and the strip. When the wires are so oriented, the likelihood of accidental breakage of the wire is minimized and the maximum hinging effect is obtained. When the serrations 24 are positioned at the front and back of the strip, when a strip is coiled or rolled into a bundle, accidental breakage may sometimes result because bending or hinging movement occurs parallel to the depth of the serrations. Furthermore, when the wires are oriented in the preferred manner, a lesser thickness requiring shearing during a driving operation is presented. Thus the preferred orientation of the serrations gives a maximum hinge thickness and minimum resistance to shearing.

So that it is not necessary to locate the zones of diminished cross-section 24 precisely with respect to adjacent notches 16 in adjacent nail shanks 12, it has been determined that there should preferably be at least about three times as many serrations 24 as there are nails in a strip. That will insure certain and easy severance of wire portions from the wires 22 during a nail driving operation, and without the likelihood of pulling wire portions out of notches 16.

Wires 22 are positioned in the aligned rows of notches 16 by pressing them into place, as with an inserting roller 104, and with the serrations opening at the top and bottom, rather than at its front and back of the strip. The notches and wires 22 may be proportioned so that they either fit loosely or in a press fit. In either event, the width of the notches 16 should not be appreciably greater than the width or diameter of the wires. Neither should the depth of the notches 16 be appreciably greater than the diameter of the wire. Desirably when a wire 0.02 inch in diameter is used, the depth of the notches 16 should be about 0.003 inch in excess of that.

After the wires are seated, nail shanks are acted on (as by a clinching or swaging operation) adjacent the sides of notches 16 to displace shank material into clinching or gripping engagement with the wires. The clinching takes place, as by a sharp, quick blow with a swaging tool 106 against the projections 20 to displace and relocate shank material, as is generally illustrated by the transition from FIGS. 6 to 7. The nail surfaces adjacent notches 16, following swaging, will become very slightly flattened and indented as is indicated at 26 (see FIGS. 2, 3 and 7).

To assemble a nail strip in accordance with this invention, it is preferable that a multiplicity of nails be positioned in a side-by-side array on a suitable support with their heads all properly positioned and overlapping as illustrated in FIG. 1. Thereafter, a suitable notching tool 100 is brought to bear each against the areas of shanks of a plurality of such nails to be notched, and a pair of rows of notches 16 are formed simultaneously in a plurality of the nails. As the notches are formed, the shank material is displaced upwardly and outwardly to form projections 20 adjacent the sides of the notches.

The dimension and shape of notches 16 and projections 20 are controlled by the shape of tool 100. Tool 100 presents a notching tongue 110, relief areas 112 to control the shapes of projections 20, and depth penetration control surfaces 114. The notched nails are then conveyed by a conveyor 102 to an inserting station 104. At the inserting station, a roller rolls an elongate filament or wire 22 into each row of notches in its proper orientation. Wire 22 is supplied from suitable supply rolls 116. The nails and wire are then carried to a clinching station at which the shanks adjacent the notch sides are swaged into the mechanically interlocked or clinched engagement illustrated in FIG. 7. Thereafter, strips S are formed into bundles or coils or are left flat and are severed at severing station 108 into appropriate lengths for subsequent use.

Although an individual strip of a multiplicity of nails, for example 50 nails, may be assembled in that manner, it is possible also to notch individual nails, and then to dispose them in a side-by-side array such as that illustrated in FIG. 1. Thereafter, the wires may be secured to the shanks in the manner described. Nail strips of this invention may also be formed progressively, as by the step-wise feeding of individual notched nails to the wire inserting station, after which the individual nails, as one or in small groups, are swaged to relocate shank material to clinchingly engage the wires.

FIG. 9 illustrates a typical environment in which a nail strip of this invention may be used. A suitable nailing tool or machine 120 mounts a reciprocable driver blade 122 and provides a properly configured magazine and guide assembly 124. A nail strip S is positioned in the magazine and guide assembly 124 and is urged inwardly of the nailing machine 120 by conventional means to a point at which the driver blade 122 overlies the head of the innermost nail.

When a nail N is to be driven, the nailing machine is actuated and the driver blade 122 is driven downwardly. The blade 122 engages the head 10 of an underlying nail N and drives it downwardly towards and into an underlying piece of material. As a nail N is pushed downwardly by the driver blade 122, the wires 22 rupture at the serrations 24 which lie between notches 16 in adjacent nail shanks 12. The gripping engagement between the shank material and the portions of the wires 22 is sufficiently strong so that the wires preferentially rupture at zones 24, rather than being torn out of, or dislodged from notches 16. When the nail enters the material to be nailed, the severed wire portions 22' are also driven into the material and become embedded therein to act as barbs to resist withdrawal of the nail N, thereby to enhance the nail's gripping power. Furthermore, the fact that portions 22' are carried with a nail into the material nailed, means that no severed portions of the nail strip remain in the tool to clog it or to cause it to malfunction, and that no portions of the nail strip remain in the work area where the nailing machine is being used to clutter that area.

A preferred nail strip in accordance with this invention has been illustrated in FIG. 1. It is, of course, possible to form similar, but less compact, nail strips with full-headed nails where, if the shanks are to be parallel, the shanks will be more widely spaced. For example, a further nail strip 200 is illustrated in FIG. 14. As there shown, each nail 202 is full-headed. The heads are disposed in a side-by-side array. A strip 200 may be assembled in the manner described previously with a pair of serrated wires 204. Such a strip may be in roll-form or flat depending upon the driving tool to be used. A nail strip incorporating full-headed nails with the heads in either the side-by-side array of FIG. 14 or in an overlapping array of FIG. 1 may be manufactured in accordance with this invention. Furthermore, T-nails and finishing nails may, where desired, also be assembled into nail strips in accordance with this invention.

It is to be understood that the embodiments described are presented as exemplifications of the principles of this invention. The scope of the invention will be pointed out in the appended claims.

What is claimed is:

1. A nail strip for use in a nailing machine comprising: a multiplicity of nails, each having a head portion, an elongated shank, and a point, with their points all facing the same direction, a shank of one nail being disposed closely adjacent a shank of a next adjacent nail, each said shank defining a notch disposed transversely with respect to the shank, the notches being aligned in an outwardly facing surface of the nail strip to provide a row of aligned notches; an elongated metallic filament disposed in said row of notches, said filament defining multiple zones of diminished cross section at predetermined intervals along its length, said zones being adapted to facilitate severance of portions of said filament from said filament at said zones when a nail is driven by a nailing machine from said strip, and shank material adjacent said notches mechanically gripping said filament in said notches.

2. A nail strip for use in a nailing machine comprising a multiplicity of nails, each having a head portion, an elongate shank, and a point, and with their points all facing in the same direction, a shank of one nail being disposed closely adjacent a shank of a next adjacent nail, each said shank defining a notch disposed transversely with respect to the shank, the notches in adjacent shanks being aligned to provide a row of aligned notches, an elongate metallic filament disposed in said row of notches, said elongate filament defining a large multiplicity of zones of diminished cross section to facilitate preferential severance of portions of said filament from said elongate filament at said zones when a nail is driven by a nailing machine from said nail strip, said zones of diminished cross section each being provided by opposed serrations, one serration of each zone facing the head of said nails and the other serration of each zone facing the points of said nails, and shank material mechanically gripping said filament to hold said filament in each of the notices of said row.

3. A nail strip in accordance with claim 2 wherein each nail shank defines at least two notches which are spaced apart lengthwise of the axis of the shank.

4. A nail strip in accordance with claim 3 wherein said filaments are spaced apart lengthwise of the shank a distance equal to at least about fifty percent of the length of a said shank.

5. A nail strip in accordance with claim 3 wherein said nails are disposed with their shanks in close adjacency and parallel to each other and with their heads overlapping, and said notches are diagonally disposed with respect to the axes of their associated shanks.

6. A nail strip in accordance with claim 5 wherein said heads are generally D-shaped.

7. A nail strip in accordance with claim 3, wherein said notches extend inwardly of the shanks a radial distance no greater than about twenty percent of the diameter of the nails.

8. A nail strip in accordance with claim 3 wherein said nail shank material gripping said filaments was adjacent the notches when the filaments were first disposed in the notches, and which nail shank material was displaced and relocated grippingly to engage said filaments.

9. A nail strip for use in a nailing machine comprising: a multiplicity of nails, each having a head portion, an elongate shank, and a point, and with their points all facing in the same direction, a shank of one nail being disposed closely adjacent a shank of a next adjacent nail, each said shank defining at least two notches spaced apart lengthwise of the axis of the shank and disposed transversely with respect thereto, the notches in adjacent shanks being aligned to provide spaced rows of aligned notches in an outwardly facing surface of the strip; an elongate metallic filament disposed in each row of notches, each filament defining a large multiplicity of zones of diminished cross section to facilitate preferential severance of portions of said filaments from said elongate filament at said zones when a nail is driven by a nailing machine from said nail strip; and shank material mechanically gripping each filament to hold said filaments in each of the notches of said row.

10. A nail strip in accordance with claim 9 in which said zones of diminished cross-section comprise serrations opening at the top and bottom of the filament rather than at the front and back thereof.

11. A nail strip in accordance with claim 9 wherein there are at least three times as many zones of diminished cross-section in each filament as there are nails in the nail strip.

12. A method of assembling a nail strip comprising a multiplicity of nails secured in a side-by-side array with their points facing in the same direction comprising the steps of forming at least two generally transverse notches in the shanks of each of said multiplicity of nails by displacing shank material outwardly of the areas of the shank in which the notches are formed, positioning said shanks in parallel adjacency with their notches aligned so that at least two rows of aligned notches are provided, positioning an elongate filament in each row of aligned notches, and squeezing the displaced material of said shanks adjacent said notches to relocate the displaced shank material into mechanical securement with each said elongate filament.

13. A method of assembling a nail strip comprising a multiplicity of nails secured in a side-by-side array with their points facing in the same direction comprising the steps of positioning said shanks in parallel adjacency and thereafter forming at least two generally transverse notches in the shanks of each of said multiplicity of nails with the notches aligned so that at least two rows of aligned notches are provided, positioning an elongate filament in each row of aligned notches, and squeezing the said shanks adjacent said notches to displace shank material into mechanical securement with each said elongate filament.

14. A method of assembling a nail strip comprising a multiplicity of nails secured in a side-by-side array with their points facing in one direction and their heads facing in an opposite direction comprising the steps of forming at least two generally transverse notches in the shanks of each of said multiplicity of nails diagonally with respect to the axes of said shanks, positioning said shanks in parallel adjacency with their notches aligned and their heads overlapping so that at least two rows of aligned notches are provided, positioning an elongate filament in each row of aligned notches, and squeezing the said shanks adjacent said notches to displace shank material into mechanical securement with each said elongate filament.

15. A method of assembling a nail strip comprising a multiplicity of nails secured in a side-by-side array with their points facing in one direction and their heads facing in an opposite direction comprising the steps of forming a generally transverse notch in the shanks of each of said multiplicity of nails, locating said shanks in close parallel adjacency with their notches aligned so that at least one row of aligned notches is provided, positioning en elongate filament in each said row of aligned notches, said filament having a plurality of radial serrations and said filament being positioned in said notches with the radial serrations disposed towards the points and heads of the nails rather than toward the front and back of the nail strip, and squeezing said shanks adjacent said notches to displace shank material into mechanical securement with each said elongate filament.

* * * * *